May 6, 1924.
J. W. PETERS
LAWN MOWER
Filed July 30, 1921
1,493,223
3 Sheets-Sheet 1
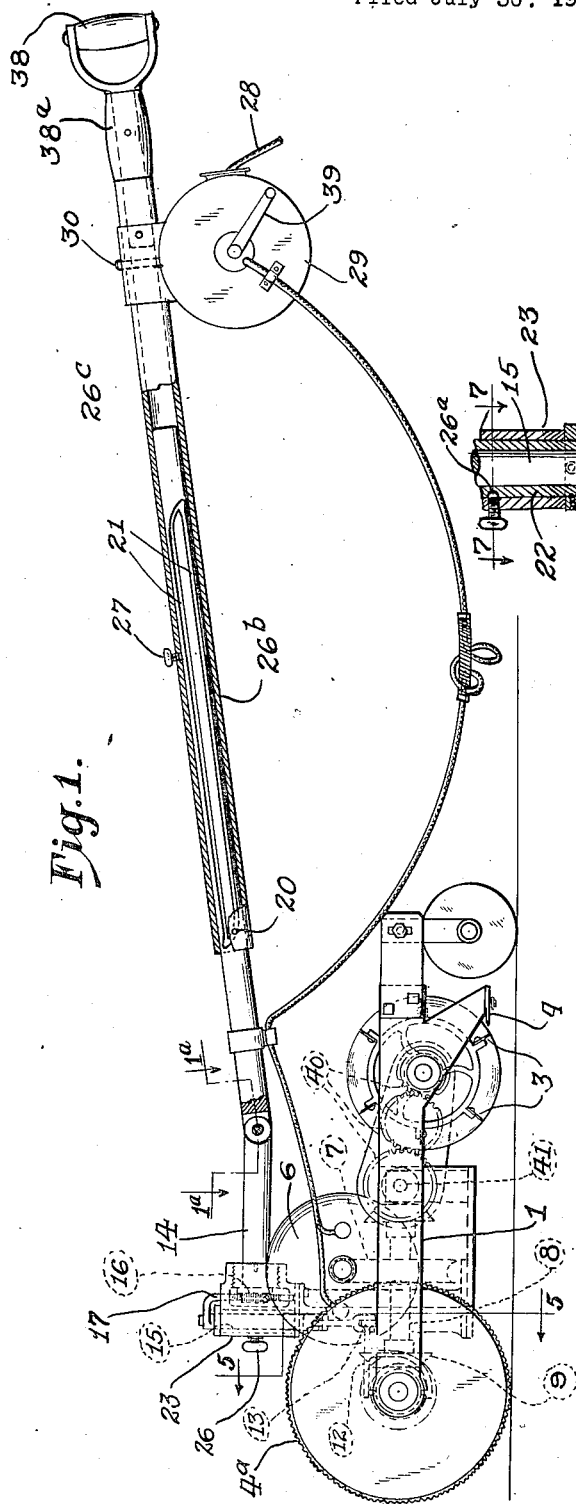
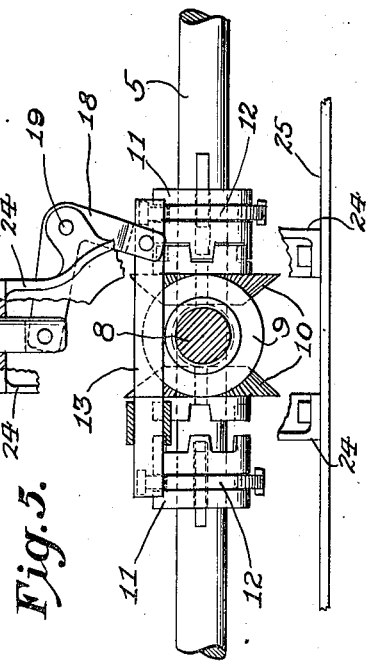

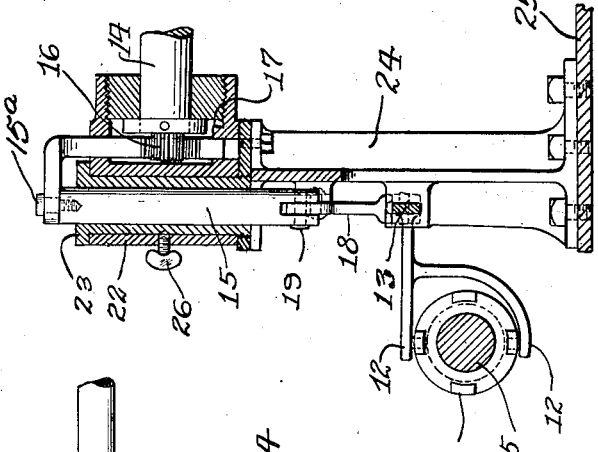
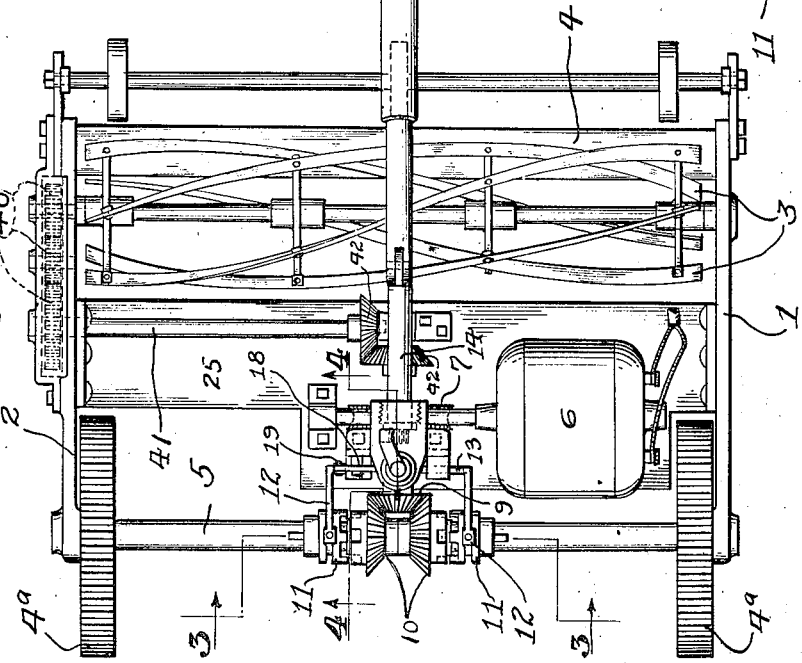
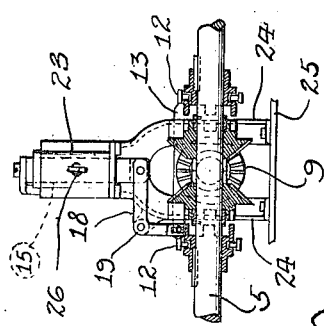

May 6, 1924.
J. W. PETERS
LAWN MOWER
Filed July 30, 1921
1,493,223
3 Sheets-Sheet 3
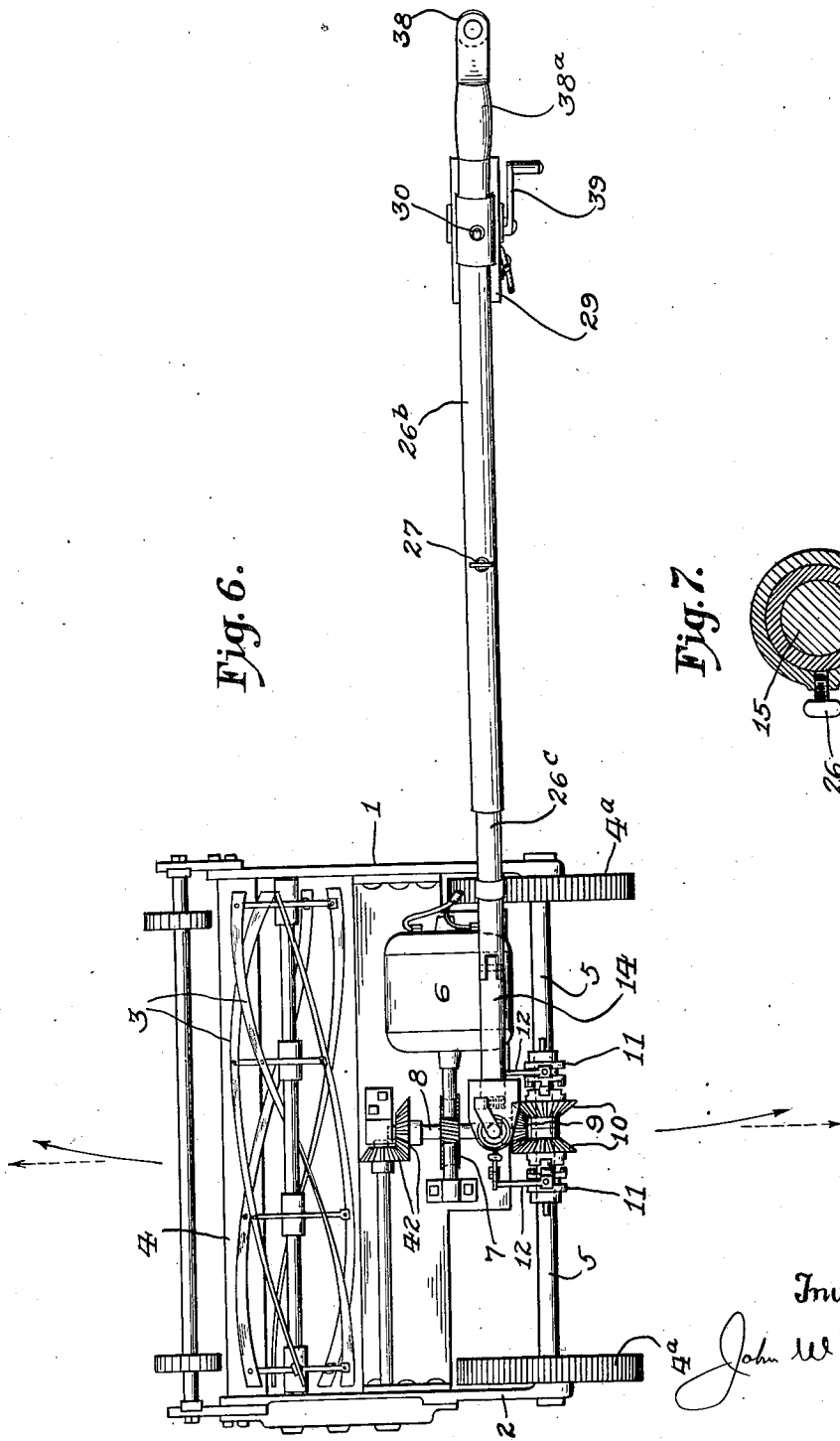
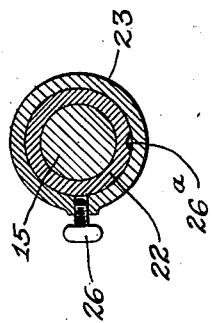

Patented May 6, 1924.

1,493,223

UNITED STATES PATENT OFFICE.

JOHN W. PETERS, OF ROSLYN, NEW YORK.

LAWN MOWER.

Application filed July 30, 1921. Serial No. 488,675.

*To all whom it may concern:*

Be it known that I, JOHN W. PETERS, a citizen of the United States, residing at Roslyn, in the county of Nassau and State of New York, have invented certain new and useful Improvements in Lawn Mowers, of which the following is a disclosure.

In my prior application, Serial No. 449,258, I have disclosed an electric lawn mower comprising a spring retracted reel mounted on the mower and carrying a flexible power cable adapted to be connected at its free end to any available power circuit, the motor being guided and controlled by the operator by means of a handle. In operating this machine it is necessary for the operator to follow it throughout the cutting operation. In order to obviate this I designed the machine described in application Serial No. 449,259, which is not only supplied with current but is guided and steered by the operator through a flexible cable, and its operation involves no physical effort or walking on the part of the operator. This machine is particularly adapted for cutting lawns having open level areas comparatively free from terraces and obstructions. The invention now to be described is an improvement on the machines referred to in that it is particularly adapted for cutting lawns comprising terraces and inclines and obstructed by flower beds, walks, etc. It is characterized by a new arrangement whereby the operator controls the machine through a handle or arm and is enabled to cut the grass in his immediate vicinity without walking or material physical effort, but is forced to follow the machine in its general direction of travel. The invention will be readily understood from a description of the preferred embodiment shown in the accompanying drawing in which:

Fig. 1 is a side elevation of the machine;

Fig. 1ª is a detail plan view partially in section, on line 1ª—1ª, Fig. 1.

Fig. 2 is a plan view with the outer end of the handle broken away.

Fig. 3 is a sectional view taken on the line 3—3 of Fig. 2.

Fig. 4 is a sectional view on the line 4—4 of Fig. 2 showing the connecting mechanism between the handle and the reversing clutches.

Fig. 5 is a part sectional view on line 5—5, Fig. 1.

Fig. 6 is a plan view similar to Fig. 2, with the exception that the handle is shown operating at right angles to the mower.

Fig. 7 is a cross section on line 7—7, Fig. 5.

Referring in detail to the structure shown, the mower comprises side frames 1 and 2 between which are mounted the rotating knives 3 and fixed knife 4. The propelling wheels 4ª are fixed to the axle 5, the outer ends of which are journaled in the side frames 1 and 2 as shown. The propelling motor 6 is connected through worm gear 7 to a shaft 8 which carries bevel gear 9 at its outer end. Bevel gear 9 meshes with two bevel gears 10 both of which are free to turn on the axle 5 when the clutches 11 are out. These clutches are slidably mounted on the axle and are thrown into and out of engagement with the gears by the yokes 12 connected to each other by the bar 13. A slight turn of the arm 14, which is connected to the connecting rod 15 by gear 16 and rack 17, turns the bell crank 18 on its pivot 19 and brings the desired clutch into operation. One clutch and gear operates the propelling wheels in one direction and the other clutch and gear operates them in the reverse direction. The arm 14 may be turned by a slight turn of the hand piece 38 by the operator or it may be automatically turned so as to reverse the direction of travel of the machine after it has traveled a predetermined distance by the operation of the pin 20 in the slot 21. It is to be noted that the slot 21 forms a closed loop as is shown in Fig. 1, with an axially inclined portion at each end, thus providing a forward and return slot in parallel relation, the inclined portions of the slot causing approximately a one quarter turn of the arm 14 whenever pin 20 traverses one of them, this movement being sufficient to engage either the right or left clutch 12 in operation. For convenience, the clutches 12 are shown in the drawings in the neutral position, excepting in Fig. 5 in which one of the clutches is engaged with one of the driving gears 10. It is to be noted further, that the knuckle joint between the arm 14 and inner telescoping member 26ª is provided with a slight play, as shown in Fig. 1ª, whereby the handle being out of alignment with arm 14, the knuckle joint acts sufficiently like a universal joint to transmit from member 26ᶜ to arm 14 the slight turn that is necessary to engage the clutches with the gears. The handle 38 may operate at times nearly in alignment with the arm 14, for which condition a horizontal grip handle 38ª is provided. The pin 20 is fixed to the outer tube of the telescoping handle and the slot 21 is curved in opposite directions at its ends so that as the pin reaches the end of its travel in either direction it turns the arm 14 and reverses the direction of travel of the machine. The arm 14 is pivoted on the fixed hollow upright 22 by rotatable sleeve 23 so that the handle can be rotated in a horizontal plane with respect to the body of the machine, as shown in Fig. 6, the member 22 being fixed to pedestal 24 bolted to the base plate 25 as shown in Fig. 4, and the rack 17 being bent over rod 15 and pivotally connected thereto by screw 15ª to permit the rack and associated parts to swing about rod 15. The handle may be fixed against rotation about member 22 by set screw 26 and notch 26ª, and if desired the outer and inner telescoping members 26ᵇ and 26ᶜ respectively of the handle may be secured to each other by set screw 27. Power is supplied to the motor through cable 28 wound on reel 29 mounted preferably near the outer end of the handle. The outer end of cable 28 is attached to any convenient electric light socket and when the power is turned on as by switch 30, the machine may be made to propel itself to its place of work, reeling out cable 28 as it goes. When the grass to be cut is reached, the operator, by holding the hand piece stationary, can cause the machine automatically to run back and forth and can give it a slight side movement so as to cut over a new course on each outward stroke by moving the handle sideways. If he desires to make a shorter stroke than that dictated by the length of the slot 21, he can do this by giving the handle 38 a slight turn. If desired, as in cutting terraces, the control handle can be set at right angles to the machine and operated back and forth entirely by turning the handle 38. When the work has been finished the machine may be returned to its place of storage under its own power and as the machine travels, the operator manually winds the cable 28 on the reel as by handle 39.

It will be noted that the rotating knives 3 are driven through gears 40, shaft 41, bevel gears 42 from the shaft 8, and run in one direction irrespective of the direction of travel of the machine.

Having now described my invention, what I claim is:

1. A lawn mower comprising a frame, a propelling motor carried on said frame, a part connected to said frame but capable of being held stationary while the mower is travelling a material but predetermined distance in either direction, and means operated by relative movement between said part and the frame for reversing the direction of motion of the frame.

2. A lawn mower comprising a frame, a propelling motor mounted on said frame, a control arm connected to said frame, means whereby the direction of travel of the mower may be reversed, and means carried by said arm whereby said reversing means may be rendered automatically operative or may be disabled at will.

3. A lawn mower comprising a frame, an electric motor mounted on said frame, means whereby said motor may drive said frame in either direction, a control arm connected to said frame, a handle carried by said control arm, a reel supported from said frame, a flexible cable wound on the reel and having its free end adapted to be attached to a power line, a conductor extending from the reel to the motor, and means operated by maintaining said handle stationary while the frame is in motion in either direction whereby the direction of travel of the frame is reversed.

4. A lawn mover comprising a frame, a motor mounted on said frame, means whereby said motor may drive said frame in either direction, a control arm connected to said frame, a handle carried by said control arm, and means operated by maintaining said handle stationary while the frame is in motion in either direction whereby the direction of travel of the mower is reversed.

5. A lawn mower comprising a frame, a motor mounted on said frame, means whereby said motor may drive said frame in either direction, a control arm connected to said frame, a handle carried by said control arm, and means operated by maintaining said handle stationary while the frame is in motion in either direction whereby the direction of travel of the mower is reversed, said reversing means being operated also upon rotation of said handle.

6. A lawn mower comprising propelling wheels, a motor mounted thereon and geared to the wheels, and a control arm mounted on the mower by a pivot connection and adapted to twist on its longitudinal axis, and means whereby twisting said arm operates to start and stop the mower.

7. A lawn mower comprising a frame, a propelling motor, a telescoping control arm extending from the mower to the operator, and means whereby telescoping movements of said arm may reverse the direction of motion of the mower.

8. A lawn mower comprising a frame, a propelling motor and a telescoping control arm extending from the frame to the operator in combination with means whereby telescoping movements of said arm reverse the direction of travel of the mower.

9. A lawn mower comprising a frame, a propelling motor and a telescoping control arm extending from the mower to the operator in combination with automatic means for reversing the direction of travel of the mower after predetermined motion in either direction, and means whereby the operator may reverse the direction of travel at will.

10. A lawn mower comprising a frame, wheels on said frame, motive means connected to drive said frame, a rearwardly extensible arm connected to said frame at one end and having a hand piece at the other end, and means whereby a person holding said hand piece may reverse the direction of rotation of said wheels at will.

JOHN W. PETERS